US011772459B2

(12) United States Patent
Iliffe-Moon et al.

(10) Patent No.: US 11,772,459 B2
(45) Date of Patent: Oct. 3, 2023

(54) METHOD, AN APPARATUS, AND A MACHINE-READABLE MEDIUM FOR DISPENSING A SCENT

(71) Applicant: Bayerische Motoren Werke Aktiengesellschaft, Munich (DE)

(72) Inventors: Etienne Iliffe-Moon, Menlo Park, CA (US); Brian Mok, Santa Clara, CA (US); Annabelle Coffinet, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 857 days.

(21) Appl. No.: 16/722,620

(22) Filed: Dec. 20, 2019

(65) Prior Publication Data

US 2021/0188048 A1 Jun. 24, 2021

(51) Int. Cl.
*A61L 2/22* (2006.01)
*A61L 2/24* (2006.01)
*B60H 3/00* (2006.01)
*G05B 13/02* (2006.01)

(52) U.S. Cl.
CPC ......... *B60H 3/0035* (2013.01); *G05B 13/024* (2013.01); *G05B 13/0265* (2013.01)

(58) Field of Classification Search
CPC ... A61L 2/22; A61L 2/24; A61L 9/125; A61L 9/14; A61L 2209/11; A61L 2209/132; A61L 2209/133; A61L 2209/21; B60H 3/0035; G05B 13/024
USPC ............ 422/5, 105, 119–120, 123, 305–306; 239/8, 61, 71
See application file for complete search history.

(56) References Cited

FOREIGN PATENT DOCUMENTS

| DE | 1 184 083 A1 | * | 6/2002 | ............... B05B 7/00 |
|----|----|----|----|----|
| EP | 1184083 A1 | | 3/2002 | |
| WO | 2018022562 A1 | | 2/2018 | |
| WO | 2019030771 A1 | | 2/2019 | |
| WO | 2019154328 A1 | | 8/2019 | |

\* cited by examiner

*Primary Examiner* — Monzer R Chorbaji
(74) *Attorney, Agent, or Firm* — 2SPL Patent Attorneys PartG mbB; Kieran O'Leary

(57) ABSTRACT

Embodiments generally relate to a method, an apparatus, and a machine-readable medium for scent dispensing. In particular, embodiments relate to a method dispensing at least one scent medium into an atmosphere. The method comprising increasing a concentration of the at least one scent medium in the atmosphere during a first time period; decreasing a concentration of the at least one scent medium in the atmosphere during a second time period; and increasing a concentration of the at least one scent medium or another scent medium in the atmosphere during a third time period.

18 Claims, 4 Drawing Sheets

METHOD, AN APPARATUS, AND A MACHINE-READABLE MEDIUM FOR DISPENSING A SCENT

FIELD

Embodiments generally relate to a method, an apparatus, and a machine-readable medium for scent dispensing. In particular, embodiments relate to a concept for a scent dispensing rhythm or time course.

BACKGROUND

The human body is affected by its sense of smell. Leveraging a person's sense of smell can cause both physiological and psychological effects. It can also affect the sensory system as a whole. And, in turn, how a person perceives a smell can be influenced by the other senses in interesting ways.

Many industries, including the automotive industry, have only slowly incorporated an olfactory sense experience into their products or have done so on a very basic level. Common problems with scent dispensing apparatuses include the over-delivery of scents, the delivery of singular scents, and the delivery of only a limited number of fragrances. This may lead to olfactory fatigue, which is a phenomenon that results in temporary inability to distinguish a particular odor after prolonged exposure to it. Additionally, these dispensers, also known as air fresheners, are not designed for the automotive application. Hence, there may be a desire for an improved scent dispensing method that can deliver a richer sensory experience.

SUMMARY

Embodiments in the present disclosure relate to a method for dispensing at least one scent medium into an atmosphere. According to an embodiment, a method for dispensing at least one scent medium into an atmosphere comprises increasing a concentration of the at least one scent medium in the atmosphere during a first time period. Then decreasing a concentration of the at least one scent medium in the atmosphere during a second time period. And lastly, increasing a concentration of the at least one scent medium or another scent medium in the atmosphere during a third time period.

Olfactory fatigue is an example of a neural or sensory adaptation where one loses the ability to perceive a particular odor after prolonged exposure to the particular compound. It can also be known as odor fatigue, olfactory adaptation, and nose blindness. Common examples include: when a person applies cologne and then loses the ability to smell it after a short time while others the person meets can smell it readily, losing the ability to perceive a stinky trashcan until one returns home, or being overwhelmed by the strong smell of popcorn in a movie theater only for the awareness of the odor to fade to the point where the smell is not perceptible or is much weaker. It is a finding that leaving the area of high odor will restore the sensitivity to it over time. The perception of a fragrance might be prolonged if the fragrance profile of an environment is constantly changed. This may mean adjusting the concentration of a scent medium from a high concentration to a lower one and then back. This stimulates the olfactory system again rather than overwhelming it with one continuous scent release.

According to another embodiment, the scent dispersing method might release less scent in a second time period as compared to the first time period and the scent concentration naturally decreases. Molecules of gas, such as a scent, tend to occupy the entire volume available to them in a process called diffusion. A scent dispensing method might take advantage of this property by allowing scents to diffuse naturally, rather than using active means to cleanse the scent from the air. This might save on energy while conserving the scent medium available to the system.

The first, second, and third time periods may define a repetitive rhythm for scent concentration in the atmosphere. For example, the third time period is the first time period defining a repetitive rhythm for the dispersing the at least one scent medium concentration into the atmosphere. Delivering rhythms or pulses to the atmosphere might both prevent olfactory fatigue while also providing a perception of newness and creating anticipation for a person perceiving the scent. Delivering scent rhythms also increases the efficiency of the scent delivery system by only delivering a scent that can effectively be sensed or recognized by the user. This means the amount of scent delivered into the cabin can be optimized and the life of the scent cartridge prolonged or the size of the scent cartridge optimized for its service life.

According to another embodiment, the rhythm is configured to avoid adaptation of human perception to the scent concentration. This might allow for a scent medium to be better allocated and better tailored to the person using a system with the rhythm. A system using this method may sample the concentration of a scent in the atmosphere and increase the concentration from a second time period to a third time period only by enough to return the scent to a specified level rather than by a predefined amount that may overwhelm the olfactory perception of a user in a saturated atmosphere.

The method can further comprise a duration of the first time period that is shorter than the second time period. Pulses of scents might only last a short period, depending on the concentration of the formula of the scent medium and the dynamics of the atmosphere the fragrance is diffusing into. Having a short release period with a long diffusion period might prolong the user's olfactory perception as well as prolong the scent medium used by the method.

According to another embodiment, the duration of the first time period is less than one minute. Prolonged-release periods may cause the user of the method to more readily adapt to the scent and lose their perception of it. Shorter periods of release, may be fractions of a second, may effectively deliver the scent while conserving the scent media, prolonging the experience, and reducing the amount of wasted scent that may pollute a system that employs the method. If a system uses peripheral components, a short scent release period might avoid situations where the peripheral components are contaminated with the scent medium. A system with contaminated peripheral components may inadvertently prolong the scent when unscented air passes through the peripheral components. It may also contaminate a subsequent scent with a previous one.

An embodiment of the method may comprise having the atmosphere in a neutral state before the first time period and wherein the concentration of the at least one scent medium is increased to an intensity level above the neutral state. Creating an atmosphere where there are no or limited other scents may allow for a better perception of the desired scent medium as well as requiring less scent overall to be dispensed to cover or hide other undesirable scents.

According to another embodiment, the method comprises waiting during the second time period until the concentration of the at least one scent medium fades to the neutral state. The method further comprises refreshing the concentration of the at least one scent medium by repeating the first and second time periods. By allowing the atmosphere to return to a neutral state the scent perception might be prolonged further than if the scent is refreshed before the dissipation of the previous dispersal.

The method may further comprise refreshing of the concentration of the at least one scent medium at a different intensity level. Increasing the concentration level of a refreshed scent might cause the perception of the scent to be renewed while decreasing the concentration level of a refreshed scent might conserve scent media.

The duration of the second time period may be a constant time. Using a constant time to wait to disperse the scent may make it cheaper to produce and implement a system implementing the method.

The method may comprise increasing the concentration of the at least one scent medium in the atmosphere during a first time period is done to a minimum intensity level. Then an iteration of the refreshing of the concentration of the at least one scent medium is done at a higher intensity level until a maximum intensity level is reached. This method starts with the lowest intensity level that is perceivable, waiting for a period for the scent to disperse. The method repeats, increasing the intensity level to be higher than the previous release until a maximum level of intensity is reached. This may also address olfactory fatigue.

According to another embodiment, a concentration level of the at least one scent medium may be adjusted before increasing the concentration of the at least one scent medium into the atmosphere. Adjusting the concentration level of a scent medium allows for the olfactory perception of the scent to be prolonged by attuning the release of the scent. For example, if the atmosphere is saturated with a scent, the concentration level might be lowered to not overwhelm the nose of a user and cause the user to start to ignore the scent. However, if the concentration is low then increasing the concentration might cause the user to perceive the scent better.

According to another embodiment, the method may further comprise fading between different scents. For example, the method may fade between the at least one scent medium and a subsequent at least one scent medium during a subsequent rhythm. Different scents may be released simultaneously or be interspersed creating different layers of harmonies that change the user's perception of the overall scent profile. Additionally, the release of different scent mediums could be released at different rhythms creating different melodies as perceived by the user. By adding or alternating scent media and the timing of the release of the scent media, the user may experience a perception of newness and surprise. Changing the scent avoids the problem of olfactory fatigue by introducing a new scent while allowing the nose to recover and re-perceive a first scent with increased vigor when it is reintroduced.

According to another embodiment, the method is configured to prolong an at least one user's perception of an at least one scent medium in the atmosphere. The method further comprises delivering the at least one scent into the atmosphere at an upper-intensity level during the first time period; wherein the upper-intensity level is perceivable to the at least one user. The method further comprises waiting during the second time period until upper-intensity level of the at least one scent fades into a lower intensity level, wherein the lower intensity level is less perceivable to the at least one user than the higher insensitivity level, and refreshing the at least one scent by repeating the steps of the first time period during the third time period.

The third time period may be the first time period. The method may further repeat until the lower intensity level is not less perceivable to the at least one user than the higher intensity level. Once adding additional scent to the atmosphere has a negligible difference on the perception of the scent it is unnecessary to continue to release a scent into the atmosphere because it no longer affects a user. This will conserve the scent as well allow the user to naturally re-experience the scent as it dissipates over some time.

Another embodiment of the method further comprises actively adjusting an intensity level of the scent by coordinating a scent delivery system with a climate control system, a heating system, a ventilation system, and/or an air conditioning system. Coordinating the scent delivery system with the climate control or heating ventilation and air conditioning (HVAC) system might increase the air circulation within the cabin (e.g. ambient airflow, forced airflow, etc.) or introduce fresh air into the cabin (e.g. through the HVAC system, opening external vents or windows, etc.) to dilute or flush the air. This might aid with removing any scent from the atmosphere and restoring a scent-neutral experience. It also might introduce other scents from the outer atmosphere that might also aid in the resetting of the user's olfactory experience, allowing an original or additional scent to be introduced to the user.

The method might further comprise removing or decreasing a concentration of the scent using one or more elements of the group of an air purification system, a carbon filter, a chemical absorption system, and a photo-catalytic filter. Removal or reduction of scent may be applied generally throughout the use of the scent delivery device, after the use of the device or during certain periods, such as the decreasing concentration period.

An additional embodiment might further comprise sensing an ambient olfactory level or character and adapting at least one element of the group of a released scent, a performance of the scent delivery, the first, second, and third time periods accordingly. Sensing the ambient level (or ambient olfactory character of the cabin or cabin air smell) and adapting the released scent, characteristics of the scent delivery and/or rhythm accordingly might improve the performance of the scent delivery making it more effective to perceive as well as more efficient to deliver.

The method may further comprise adjusting the first, second, or third time periods based on one or more elements of the group of settings, sensor data, user input, lighting transitions, changes in a vehicle user interface, an infotainment system, a scent dispensing system, and a vehicle system. Scent rhythm parameters can be driven by settings (e.g. timed settings that are randomized, preset, preselected, pre-calculated, etc.), directly controlled by the user or controlled by sensor data, contextual data, and/or smart algorithms, operating in real-time or during/throughout the passenger's or vehicle's journey. This allows the delivery of the scent to be customized based on the user's own experience of the scent and can use the presence of other sensory effects to increase the olfactory perception of the fragrance. For instance, if a user is experiencing scenery that may evoke a scent (e.g. the user is driving through a forest or an orchard), the delivery of a fresh or earthy scent (e.g. pine or apple) might not need to be as concentrated. The user's visual perception of their surroundings may enhance their olfactory perception requiring less scent to be dispersed. This may be true even if the user is sealed off from the natural scents of the scenery.

Additionally, the method may integrate or coordinate with a multi-sensory component or modality, such as a change in ambient lighting color. Adjusting the ambient color may increase a user's perception of a smell allowing for less scent to be released and reducing olfactory fatigue. For example, by adjusting the lighting to blue while dispensing a lavender scent, the user may perceive the scent more intensely than if only the scent was dispensed allowing for less scent to be dispensed to stave off olfactory fatigue.

The method can also be performed by an apparatus for dispensing at least one scent medium into an atmosphere. The apparatus comprises a processor configured to increase a concentration of the at least one scent medium in the atmosphere during a first time period; decrease a concentration of the at least one scent medium in the atmosphere during a second time period; and increase a concentration of the at least one scent medium or another scent medium in the atmosphere during a third time period.

Further, the method might also be performed by a non-transitory machine-readable medium comprising instructions to perform scent delivery. The instructions comprising increasing a concentration of the at least one scent medium in the atmosphere during a first time period; decreasing a concentration of the at least one scent medium in the atmosphere during a second time period; and increasing a concentration of the at least one scent medium or another scent medium in the atmosphere during a third time period. This allows for existing computer controlled-apparatuses to be configured to execute the method.

BRIEF DESCRIPTION OF THE FIGURES

Some embodiments of apparatuses and systems will be described in the following only by way of example and with reference to the accompanying figures, in which:

FIG. 1A shows one iteration of the rhythm/time course and FIG. 1B shows the repetition of the rhythm/time course.

DETAILED DESCRIPTION

Various embodiments will now be described more fully with reference to the accompanying drawings in which some embodiments are illustrated. The thicknesses of lines, layers, and/or regions in the figures may be exaggerated for clarity.

Accordingly, while further embodiments are capable of various modifications and alternative forms, some particular embodiments thereof are shown in the figures and will subsequently be described in detail. However, this detailed description does not limit further embodiments to the particular forms described. Further embodiments may cover all modifications, equivalents, and alternatives falling within the scope of the disclosure. Same or like numbers refer to like or similar elements throughout the description of the figures, which may be implemented identically or in modified form when compared to one another while providing for the same or similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations (i.e. only A, only B, as well as A and B) if not explicitly or implicitly defined otherwise. An alternative wording for the same combinations is "at least one of A and B" or "A and/or B". The same applies, mutatis mutandis, for combinations of more than two elements.

The terminology used herein for the purpose of describing particular embodiments is not intended to be limiting for further embodiments. Whenever a singular form such as "a," "an" and "the" is used, and using only a single element is neither explicitly or implicitly defined as being mandatory, further embodiments may also use plural elements to implement the same functionality. Likewise, when a functionality is subsequently described as being implemented using multiple elements, further embodiments may implement the same functionality using a single element or processing entity. It will be further understood that the terms "comprises," "comprising," "includes" and/or "including," when used specify the presence of the stated features, integers, steps, operations, processes, acts, elements, and/or components but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the embodiments belong.

Figure 1A:
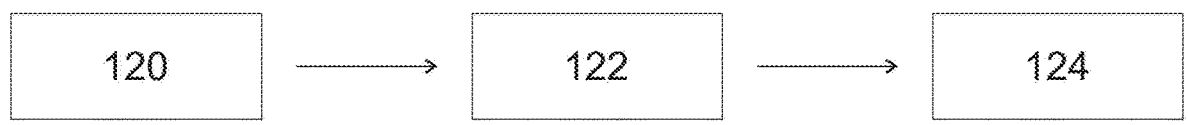
FIGS. 1A and 1B show block diagrams of an embodiment of a method for a sense dispensing rhythm/time course.
Figure 1B:
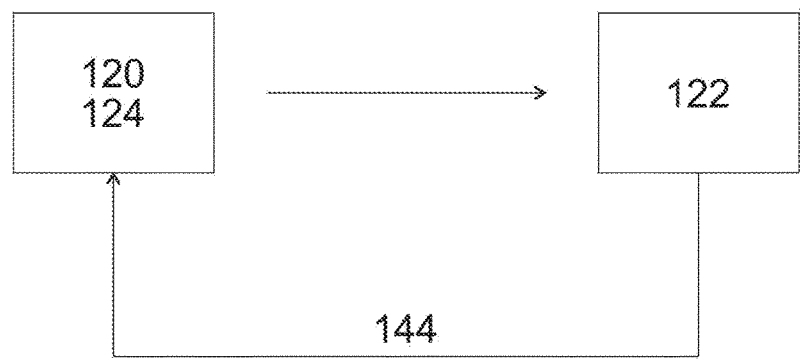

FIGS. 1A and 1B show block diagrams of a method 100 for a sense dispensing rhythm. FIG. 1A shows a method 100 for dispensing at least one scent medium into an atmosphere. The method 100 comprises increasing a concentration of the at least one scent medium in the atmosphere during a first time period 120. The method continues by decreasing a concentration of the at least one scent medium in the atmosphere during a second time period 122. The method 100 then further comprises increasing a concentration of the at least one scent medium or another scent medium in the atmosphere during a third time period 124. An atmosphere can be any environment, including a vehicle or a home, where the scent can be dispersed and might be perceived. Increasing a concentration of at least one scent medium means dispersing, diffusing, or otherwise delivering a scent into the atmosphere during a time period 120, 124. Increasing concentration might not be a continuous release of a scent and might result in bursts or pulses over the time period 120, 124 where the scent concentration is increasing. Time periods 120, 124 for increasing a scent medium or fragrance are temporary. Scents delivered in pulses might last for a very short period of time.

Various circumstances may initiate the method 100. For a system performing a method in a vehicle, for example, the method 100 may begin when a door is closed or opened or the engine is started or stopped. The method 100 may begin when a navigation system denotes that a journey is beginning or ending. The method 100 may begin when a user activates a system performing the method. Additionally, the method may begin if a system senses or detects the approach of a user from outside the vehicle. The method controls the release control parameters to control, minimize, improve, or optimize the bloom of the fragrance in the air. During the second time period 122, the method may reduce or minimize the amount of scent released into the cabin, and use this to control and manipulate the perception of the scent aroma by the user.

FIG. 1B shows the method 100 further comprising the third time period 124 being the first time 120 period defining a repetitive rhythm for the dispersing the at least one scent medium into the atmosphere. A rhythm might continue indefinitely. The repetition of the rhythm between increasing and decreasing concentration might prevent olfactory fatigue.

Figure 2:
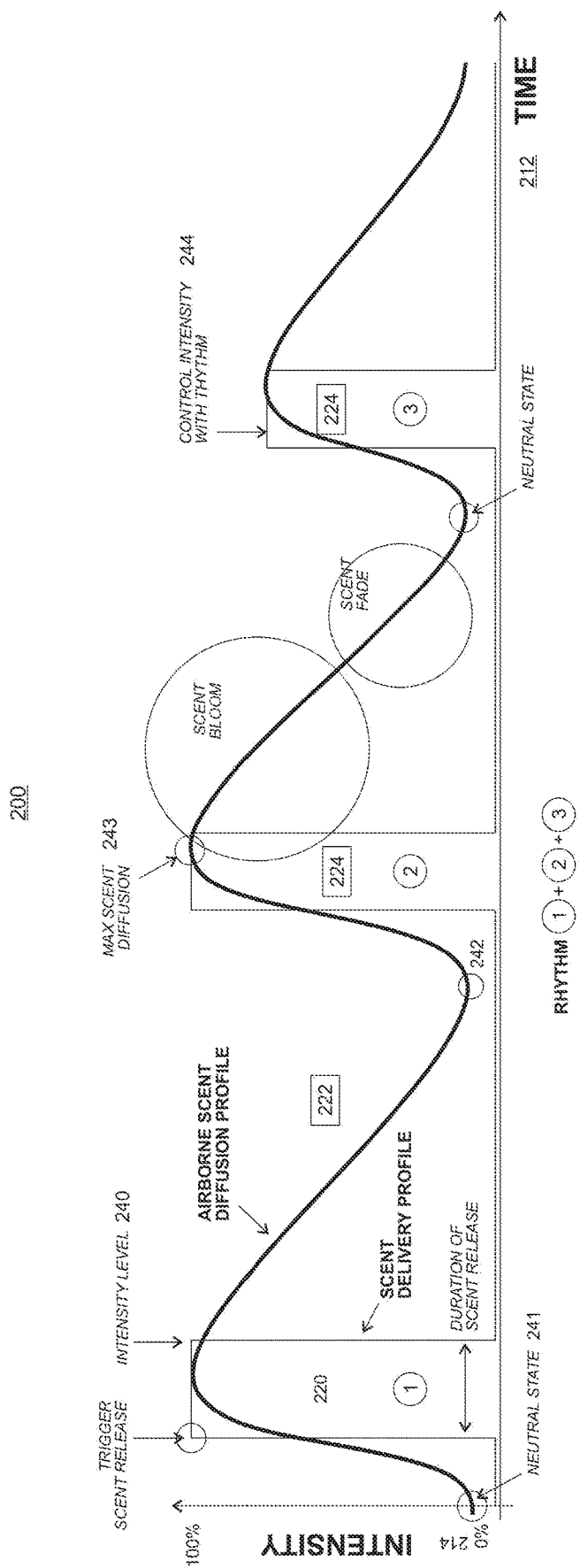
FIG. 2 shows a schematic graph of a dispersed scent over time in an embodiment.

FIG. 2 is a schematic graph of the method 200 for a dispensing a concentration 214 at least one scent medium into an atmosphere over time 212. The graph in FIG. 2 shows intensity in percent on the ordinate and time on the abscissa. The method 200 comprises increasing a concentration 214 of the at least one scent medium in the atmosphere during a first time period 220. Then the method comprises decreasing a concentration 214 of the at least one scent medium in the atmosphere during a second time period 222. The method 200 further comprises increasing a concentration 214 of the at least one scent medium or another scent medium in the atmosphere during a third time period 224. The intensity variations that are shown in FIG. 2, which are between approximately 10% and 95%, are just an example and in other embodiments the intensity may vary in other bounds.

Decreasing a concentration 214 might further comprise pausing a scent dispensing during the second time period 222, such that less scent is released as compared to the first time period 220 and the scent concentration decreases naturally. Scent dispersing during the second time period 222 might not cease but be reduced. Naturally decreasing concentration means allowing the scent dispersed scent to dilute or diffuse. Diffusion is when molecules of gas, such as a scent, tend to occupy the entire volume available to them. As scent molecules spread out they dilute and eventually decay. This causes the scent to become less perceivable. A scent may still be released at a lesser rate than in the first time period 220 in a way that prolongs the decrease of the scent or holds a level of scent concentration in the atmosphere but does not increase the scent. This might be suitable for cases where a scent is diffusing too rapidly, such as in a vehicle with one or more windows open. Or this might be for when a background level of a scent is warranted such as in the case where an undesirable scent is competing with the dispensed scent or in order to maintain a scent at a level that a new person entering the atmosphere can perceive the scent without waiting for increasing a concentration 214 of the at least one scent medium during the first 220 or third 240 time periods.

Decreasing a concentration 214 might comprise actively removing a scent from the air during the second time period 222. This might involve odor or malodor reduction or treatment by applying air purification technology to eliminate odors, malodors and pollutants (including volatile organic compounds (VOCs), sulfur oxides (SOx), and nitrogen oxides (NOx), ozone, bacteria, mold, and allergens). The method may use the HVAC to decrease a concentration 214 by dissipating or neutralizing the scent from the air. This can be done by increasing the airflow through the cabin or introducing fresh air via the HVAC system.

The method 100 might be configured to avoid adaptation of a human perception to the scent concentration. Avoiding the adaptation of a human perception to the scent concentration might involve knowing a user of the method's perception levels and dispensing the concentration of an at least one scent medium in a way that prolongs the perception of the scent by the user. Knowing the user could involve recording a max scent diffusion 243 and neutral 240 state intensity levels for a known user of the method. It may also mean using sensors to track the blooming and fading of a scent in an atmosphere to determine the concentration of a scent. This adapts the dispersal of the scent to maximize human perception.

Knowing a user of the method's perception levels can be achieved by gathering information on a user's sensitivity is through a user interface test or exercise that releases a scent at a certain intensity level. The test then asks a question about the intensity and whether they liked or disliked the intensity level (e.g. through a thumbs up or down, smiley, or rating from 1 to 5 interface mechanism). This question then gets repeated for the same or different scent at a higher and lower intensity level. Alternating between different scents and carefully chosen time pauses between samples may help with overcoming olfactory fatigue during this test. This test can be done at initial setup, on-demand by the user, or periodically initiated by the method (e.g. when the cartridge or other containers for the scent medium dispensing system are changed or at certain time periods during the life of the cartridges. Certain time periods during the life of the cartridges may include during initial setup when the scent media in the cartridge is at 100% and at 75%, 50% and 25% of the cartridge scent level or life. Machine learning may also be used to aid in this process and determine the best time for testing.

The method 100 might comprise a duration of the first time period 220 that is shorter than the second time period 222. This applies to any time periods (220, 222, 224) for the increasing and decreasing periods. Generally, the period of increasing concentration (220, 224) may be much smaller than the period of decreasing concentration (222). For example, the increasing period is typically measured in seconds, but the decreasing concentration period (222) could be equal to the increasing period (220, 224), or from 1 to 10 minutes, or 20 or 30 minutes.

The method 100 might comprise the duration of the first time period 220 is less than one minute. For example, the increasing concentration period (220, 224) could be equal to the decreasing period (222), or less than 1 minute, or less than 30 seconds, or less than 1 second.

The atmosphere may be in a neutral state 241 before the first time period 220 and the concentration of the at least one scent medium may be increased to an intensity level 240 above the neutral state 241. A neutral state 241 might not mean there is no scent medium in the atmosphere. A neutral state 241 might be a base or background level of the scent that is perceptible but does not cause olfactory fatigue. Therefore increasing the scent to an intensity level (240, 244) above the neutral state 241 increases the perception of the scent.

FIGS. 1B and 2 also show a method comprising waiting during the second time period (122, 222) until the concentration of the at least one scent medium fades to the neutral state 241. Wherein the method further comprises refreshing the concentration of the at least one scent medium by repeating the first (120, 220) and second (122, 222) time periods.

Increasing or refreshing the concentration 214 of the at least one scent medium might be done at a different intensity level. A duration of the second time period (122, 222) might be constant.

Across each iteration of refreshing the concentration across pulses, the scent intensity can increase progressively, decrease progressively, or follow a curve (e.g. a typical frequency curve such as a sinusoidal curve). Additionally, across iterations, one scent may decrease or fade out while another scent increases or fades in.

Additionally, the method might comprise adjusting a level of the at least one scent medium (144, 244) prior to the increasing of the concentration of the at least one scent medium into the atmosphere.

An embodiment of the method 100 might comprise increasing the concentration 240 of the at least one scent medium in the atmosphere during a first time period 220 is done to a minimum intensity level a 242. Then, an iteration of the refreshing of the concentration of the at least one scent medium is done at a higher intensity level until a maximum intensity level 243 is reached.

The method might comprise fading between the at least one scent medium and a subsequent at least one scent medium during a subsequent rhythm. Introducing a different scent medium or media at any subsequent time will direct attention to the newly added scent media. Constantly changing the fragrance profile may prevent a user from adapting to the smell of the scent. This might involve adjusting the level of intensity of a scent, adjusting a character of a scent (e.g. by adding different scent or by adjusting another aspect of the atmosphere, such as the humidity or temperature, that affects the perception of the scent), or adjusting by adding additional scents. This might allow the perception of the original scent media to recover quicker.

Running multiple scents in combination, in parallel, or within a defined time offset (so that the scent mixes or layers in the air) allows the scents to blend into a fragrance or chord aroma. FIG. 2 further shows a method 100 configured to prolong an at least one user's perception of an at least one scent medium in the atmosphere, comprising delivering the at least one scent into the atmosphere at an upper-intensity level 240 during the first time period 220. The upper-intensity level is perceivable to the at least one user. The method further comprises waiting during the second time period 222 until upper-intensity level 240 of the at least one scent fades into a lower intensity level 242. The lower intensity level 242 is less perceivable to the at least one user than the higher insensitivity level 240. The method further comprises refreshing the at least one scent by repeating the steps of the first time period during the third time period 224. A lower intensity level 242 might not be a neutral state 241. This might be because the scent medium is not dispersing in the atmosphere or because prolonged exposure to the scent media over a plurality of rhythm repetitions is reducing the user's perception of its scent or smell. This may be determined algorithmically, through data determined about the user's perception, or through taken measurement(s). Data determined about a user's perception may be specific to the user or taken from studies of one or more possible users and how they respond to olfactory fatigue. Measurements may include simulations run involving scent dispersal in a controlled atmosphere, such as the interior cabin of a vehicle. These measurements may be actual experiments or simulations run on a computer using machine learning.

The third time period 224 may be is the first time period 220 and the method repeats until the lower intensity level is not less perceivable to the at least one user than the higher intensity level.

Additionally, the method 100 might further comprise actively adjusting an intensity level 240 of the scent by coordinating a scent delivery system with a climate control system, a heating system, a ventilation system, and/or an air conditioning system. The method might fade or adjust the intensity level of the scent by coordinating the scent delivery system with the climate control or a heating, ventilation, and air conditioning (HVAC) system. For example, increasing the air circulation within the cabin (e.g. ambient airflow, forced airflow, etc.) or introducing fresh air into the cabin (e.g. through the HVAC system, opening external vents or windows, etc.) to dilute or flush the air. Integration into existing vehicle systems allows for the method to control the dispersal of a scent using existing airflow systems, as well as allowing the scent to be adjusted using additional elements like the heating, ventilation, and air conditioning systems. This may prolong a scent, disperse a scent, adjust the character of a scent, or allow multiple scents to better intermix, creating new scent experiences. Integration may mean integration on a software level (e.g. control to read or write data to the HVAC system) and hardware integration where the method 100 has a relationship to and may be performed on the physical air source, ducting, venting and functionality of the HVAC system.

The method 100 may be used by a vehicle with a convertible roof (i.e. a convertible car). The rhythm may adapt for when the roof is up and the cabin is enclosed cabin compared to when the roof is down and the user is exposed to the open air. For example, when the roof is down the method may extend the duration of the scent release during the first 220 and third 224 time periods to compensate for the increased diffusion or dilution of the scent that comes from the increased airflow. Another embodiment of the method may vary or augment the duration time periods (220, 222, 224) adapting to the challenges of having a more open environment. The method 100 may also be adapted depending on whether the windows are up or down. For example, when the windows are up the cabin is more sheltered and there is less turbulent airflow and less diffusion so the method may increase the concentration of a scent at a lower concentration 240 than if the windows are down.

Additionally, the method 100 may be coordinated with the windows with increasing concentration 240 of a scent, such that the windows are rolled up just before a first 220 or third 224 time period and the windows are rolled back to the prior position after the scent release is complete during a second time period 222.

Decreasing a concentration 214 of a scent may comprise removing the scent using one or more elements of the group of an air purification system, a carbon filter, a chemical absorption system, and a photo-catalytic filter. The method might include actively remove the scent with an air purification system (e.g. a carbon filter, chemical absorption, photo-catalytic filter, etc.). This could be applied generally throughout the use of the scent delivery, after the use of the device or during certain periods, such as the decreasing concentration period 222.

Figure 3:
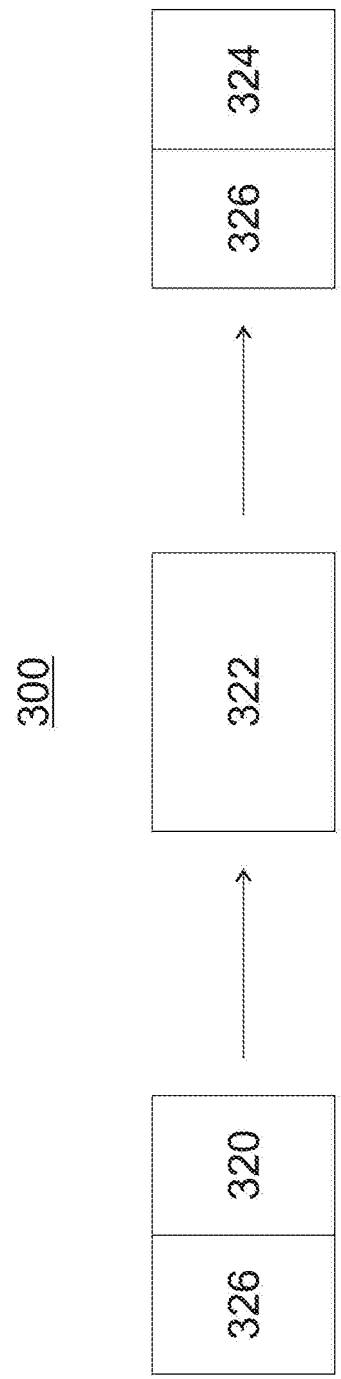
FIG. 3 shows a block diagram of a further embodiment of a method for a sense dispensing rhythm.

FIG. 3 shows a block diagram of a method 300 for a sense dispensing rhythm. FIG. 3 shows a method might further comprising sensing 326 an ambient olfactory level or character and adapting at least one element of the group of a released scent, a performance of the scent delivery, the first 320, second 322, and third 324 time periods accordingly. Scent rhythm parameters can be driven by settings (e.g. timed settings that are randomized, preset, preselected, precalculated, etc.), directly controlled by the user or controlled by sensor data, contextual data, and/or smart algorithms, operating in real-time or during/throughout the passenger's or vehicle's journey.

A method 300 might further comprise adjusting 326 the first 320, second 322, or third 324 time periods based on one or more elements of the group of settings, sensor data, user input, lighting transitions, changes in a vehicle user interface, an infotainment system, a scent dispensing system and a vehicle system. The method may control one or more elements of the group of a navigation or traffic component, an infotainment component, weather information, safety monitoring component, and an autonomous driving system component. This allows for the method to be integrated with other external systems that can adjust and inform the perception of the smell released by the cartridge. For instance, using weather information could allow the system to attune scent based on humidity, temperature, or other aspects of the weather. Also, using infotainment could allow the scent dispersal to be adjusted to coincide with other sensory effects, such as music or video or virtual reality or augmented reality (e.g. via a head-mounted display), heightening the users' perception of a scent. The scent rhythm can be coordinated, synchronized or curated with other experiences, happening inside or outside of the vehicle (e.g. lighting transitions, changes in the vehicle user interface, infotainment system, or vehicle systems).

Data on the vehicle speed, either real-time or averaged, may drive the cadence or duration of the second time period 322. Additionally, the length or duration of the journey (taken from the navigation system as distance or estimated time) can affect the duration of the time periods (320, 322, 324). For example, stretching out or compressing the time periods, influencing the number of periods, time between periods, and cadence or time between different scents.

The method 300 may be adapted to accommodate the concentration of the scent media, which affects the intensity of the release, as different cartridges and different scents may have different concentrations or release or diffusion characteristics. Additionally, the method 300 may accommodate the natural reduction of scent concentration that occurs over the life of the cartridge and how many scent releases have occurred in total (e.g. the number of scent releases or total time that the valves have been opened to release the scent). Adapting to accommodate the concentration of the scent media can be accomplished in several ways, including receiving the level of scent media from a cartridge through an interface. Calculating the remaining level of a cartridge based on the initial contents of a cartridge and an expected level of the remaining scent media calculated by the amount of scent released by the method. For example, by recording the total amount of time that one or more cartridge valve has been open. Accurate calculations may require evaluation of the cartridge life through testing samples and accounting for any non-linearity in the scent release over the determined or maximum life of the cartridge. Sensing the level of the scent media using sensors and determining estimating a remaining level of the scent media based on a degradation of the scent from the initial release of scent from the cartridge to the latest release of scent.

Furthermore, adjusting 326 the first 320, second 322, or third 324 time periods may be based on a level of the at least one scent medium remaining in a cartridge or other container for a scent dispensing system. For example, when the cartridge is nearing the end of its life (e.g. at 25%) the duration of the time periods may need to be adapted (e.g. extended) to release a certain level of perceivable intensity. This may involve increasing the length of time the airflow passes through the scent dispenser or reducing the speed of the air so it becomes more saturated with scent. This may require a sensor because the scent intensity release of the cartridge may not be linear or a constant rate.) Additionally, the duration of time periods may need to be adapted (e.g. extended or shortened) according to the individual diffusion characteristics of a particular scent (or blend of ingredients that make up a scent).

Figure 4:
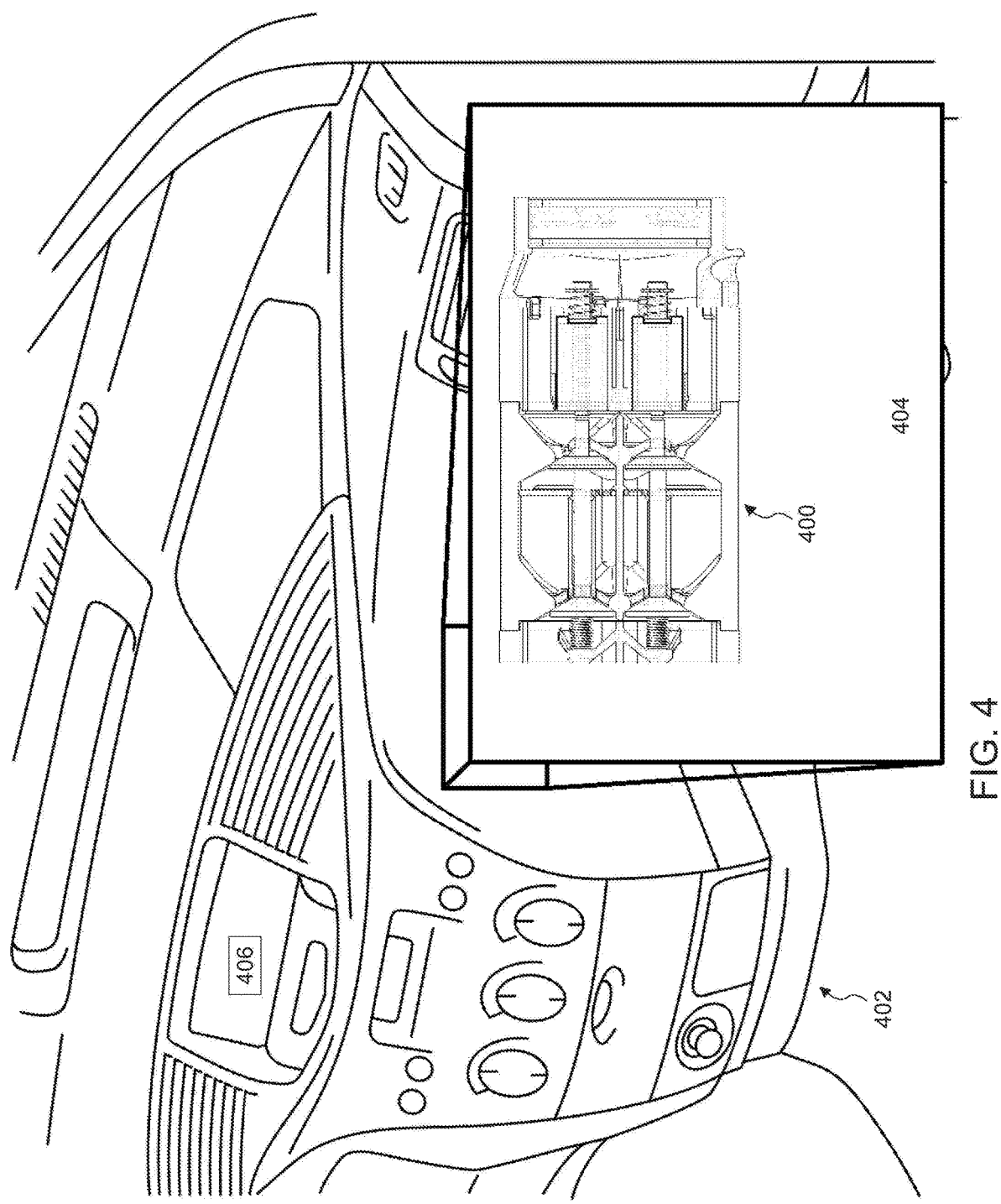
FIG. 4 shows an apparatus configured to disperse a scent into an atmosphere according to the embodiments described.

FIG. 4 shows an embodiment of an apparatus 400 for dispensing at least one scent medium. FIG. 4 further shows an embodiment of a vehicle 402 comprising an embodiment of the apparatus 400 that might perform a method for dispensing at least one scent medium into an atmosphere. The apparatus comprises a processor configured to increase a concentration of the at least one scent medium in the atmosphere during a first time period. The processor is configured to decrease a concentration of the at least one scent medium in the atmosphere during a second time period. The processor is further configured to increase a concentration of the at least one scent medium or another scent medium in the atmosphere during a third time period.

FIG. 4 further shows the apparatus 400 integrated into a vehicle's heating, ventilation, and air conditioning system 404. The system 400 might be controlled by one or more elements of the group of a vehicle operation/status component, navigation/traffic component, an infotainment component, weather information, safety monitoring component, and an autonomous driving system component 406. The apparatus 400 might also be located in a dashboard, glove box, rear parcel shelf, center console, and front or rear center armrest.

The method for dispensing at least one scent medium into an atmosphere may be performed a non-transitory machine-readable medium comprising instructions to perform scent delivery. The instructions comprising increasing a concentration of the at least one scent medium in the atmosphere during a first time period. Then further comprising decreasing a concentration of the at least one scent medium in the atmosphere during a second time period. The instructions also comprising increasing a concentration of the at least one scent medium or another scent medium in the atmosphere during a third time period.

Any of the above-described embodiments may be combined with any other embodiment (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The aspects and features mentioned and described together with one or more of the previously detailed embodiments and figures, may as well be combined with one or more of the other examples to replace a like feature of the other embodiment or to additionally introduce the feature to the other embodiment.

Examples may further be or relate to a computer program having a program code for performing one or more of the above methods when the computer program is executed on a computer or processor. Steps, operations or processes of various above-described methods may be performed by programmed computers or processors. Examples may also cover program storage devices such as digital data storage media, which are machine, processor, or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further embodiments may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples and embodiments recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", may be implemented in the form of dedicated hardware, such as "a signal provider", "a signal processing unit", "a processor", "a controller", as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field-programmable gate array (FPGA), read-only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples/embodiments a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example/embodiment. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for dispensing at least one scent medium into an atmosphere to prolong a user's perception of the at least one scent medium, the method comprising:
gathering information on the user's perception of the at least one scent medium,
wherein the user's perception of the at least one scent medium comprises determining an upper- and a lower-intensity level of the at least one scent medium in the atmosphere;
increasing a concentration of the at least one scent medium to the upper-intensity level in the atmosphere during a first time period;
decreasing the concentration of the at least one scent medium to the lower-intensity level in the atmosphere during a second time period; and
increasing the concentration of the at least one scent medium or another scent medium in the atmosphere during a third time period,
wherein the third time period is the first time period defining a repetitive rhythm for the dispersing the at least one scent medium into the atmosphere, and
wherein the rhythm is configured to avoid adaptation of the user's perception to the at least one scent medium.

2. The method of claim 1, wherein decreasing a concentration comprises pausing a scent dispensing during the second time period, such that less scent is released as compared to the first time period and the concentration of the at least one scent medium decreases naturally.

3. The method of claim 1, wherein a duration of the first time period is shorter than the second time period.

4. The method of claim 1, wherein a duration of the first time period is less than one minute.

5. The method of claim 1, wherein the atmosphere is in a neutral state before the first time period and wherein the concentration of the at least one scent medium is increased to an intensity level above the neutral state.

6. The method of claim 5, wherein the method comprises waiting during the second time period until the concentration of the at least one scent medium fades to the neutral state, and wherein the method further comprises refreshing the concentration of the at least one scent medium by repeating the first and second time periods.

7. The method of claim 6, wherein the refreshing of the concentration of the at least one scent medium is done at a different intensity level.

8. The method of claim 7, wherein
increasing the concentration of the at least one scent medium in the atmosphere during a first time period is done to a minimum intensity level, and
an iteration of the refreshing of the concentration of the at least one scent medium is done at a higher intensity level until a maximum intensity level is reached.

9. The method of claim 6, wherein a duration of the second time period is constant.

10. The method of claim 1, wherein the concentration of the at least one scent medium is adjusted prior to the increasing of the concentration of the at least one scent medium into the atmosphere.

11. The method of claim 1, further comprising fading between the at least one scent medium and a subsequent at least one scent medium during a subsequent rhythm.

12. The method of claim 1 wherein the upper-intensity level is perceivable to the user;
   wherein decreasing the concentration of the at least on scent medium comprises waiting during the second time period until the upper-intensity level fades into a lower-intensity level, and
   wherein the lower-intensity level is less perceivable to the user than the upper-insensitivity level.

13. The method of claim 12, wherein the method repeats until the lower intensity level is not less perceivable to the at least one user than the higher intensity level.

14. The method of claim 1, further comprising actively adjusting an intensity level of the scent by coordinating a scent delivery system with a climate control system, a heating system, a ventilation system, and/or an air conditioning system.

15. The method of claim 1, wherein decreasing the concentration comprises removing the scent using one or more elements of the group of an air purification system, a carbon filter, a chemical absorption system, and a photocatalytic filter.

16. The method of claim 1, further comprising sensing an ambient olfactory level or character and adapting at least one element of the group of a released scent, a performance of the scent delivery, the first, second, and third time periods accordingly.

17. The method of claim 1, further comprising adjusting the first, second, or third time periods based on one or more elements of the group of settings, sensor data, user input, lighting transitions, changes in a vehicle user interface, an infotainment system, a scent dispensing system, and a vehicle system.

18. An apparatus for dispensing at least one scent medium into an atmosphere to prolong a user's perception of the at least one scent medium, the apparatus comprising:
   a processor configured to:
      gather information on the user's perception of the at least one scent medium,
         wherein the user's perception of the at least one scent medium comprises determining an upper- and a lower-intensity level of the at least one scent medium in the atmosphere;
      increase a concentration of the at least one scent medium to the upper-intensity level in the atmosphere during a first time period;
      decrease the concentration of the at least one scent medium to the lower-intensity level in the atmosphere during a second time period; and
      increase the concentration of the at least one scent medium or another scent medium in the atmosphere during a third time period,
         wherein the third time period is the first time period defining a repetitive rhythm for the dispersing the at least one scent medium into the atmosphere, and
         wherein the rhythm is configured to avoid adaptation of the user's perception to the at least one scent medium.

* * * * *